(12) United States Patent
Peng et al.

(10) Patent No.: US 10,477,235 B2
(45) Date of Patent: Nov. 12, 2019

(54) VIDEO ENCODING APPARATUS AND VIDEO ENCODING METHOD THAT PERFORM FILTERING OPERATION DURING VIDEO ENCODING PROCESS

(71) Applicant: Novatek Microelectronics Corp., Hsinchu (TW)

(72) Inventors: Ting Peng, Xi'an (CN); Fan-Di Jou, Hsinchu County (TW); Xin Huang, Xi'an (CN)

(73) Assignee: Novatek Microelectronics Corp., Hsinchu (TW)

( * ) Notice: Subject to any disclaimer, the term of this patent is extended or adjusted under 35 U.S.C. 154(b) by 21 days.

(21) Appl. No.: 15/646,096

(22) Filed: Jul. 11, 2017

(65) Prior Publication Data

US 2019/0020894 A1    Jan. 17, 2019

(51) Int. Cl.
*H04N 19/523*    (2014.01)
*H04N 19/513*    (2014.01)
*H04N 19/82*    (2014.01)
*H04N 19/23*    (2014.01)

(52) U.S. Cl.
CPC .......... *H04N 19/523* (2014.11); *H04N 19/23* (2014.11); *H04N 19/521* (2014.11); *H04N 19/82* (2014.11)

(58) Field of Classification Search
CPC .... H04N 19/23; H04N 19/521; H04N 19/523; H04N 19/82
See application file for complete search history.

(56) References Cited

U.S. PATENT DOCUMENTS

| 8,184,705 B2* | 5/2012 | Lin | H04N 19/139 |
| | | | 348/402.1 |
| 9,414,091 B2* | 8/2016 | Pinhasov | H04N 19/61 |
| 9,549,205 B2 | 1/2017 | Chang | |
| 2006/0244868 A1* | 11/2006 | Jia | H04N 5/21 |
| | | | 348/701 |
| 2009/0167951 A1 | 7/2009 | Chiu | |
| 2010/0027665 A1 | 2/2010 | Pinhasov et al. | |
| 2011/0019093 A1* | 1/2011 | Zhong | H04N 5/144 |
| | | | 348/607 |
| 2011/0085084 A1* | 4/2011 | Jain | G06T 5/002 |
| | | | 348/598 |
| 2014/0247888 A1* | 9/2014 | Tourapis | H04N 19/172 |
| | | | 375/240.26 |
| 2018/0343448 A1* | 11/2018 | Possos | H04N 19/117 |

* cited by examiner

*Primary Examiner* — Francis Geroleo
(74) *Attorney, Agent, or Firm* — JCIPRNET

(57) ABSTRACT

A video encoding apparatus and a video encoding method are provided. The video encoding apparatus includes an integer-pel motion estimation (IME) circuit, a temporal noise reduction (TNR) circuit, a fractional-pel motion estimation (FME) circuit and an encoding circuit. The IME circuit provides the first motion vector, the error value and the co-located error value of the current block in the current frame to the TNR circuit. By using the first motion vector, the error value and the co-located error value of the current block in the current frame, the TNR circuit performs the temporal filtering process on the current block in an original image data to produce a denoised image data to the FME circuit.

22 Claims, 11 Drawing Sheets

VIDEO ENCODING APPARATUS AND VIDEO ENCODING METHOD THAT PERFORM FILTERING OPERATION DURING VIDEO ENCODING PROCESS

BACKGROUND

Field of the Invention

The invention is directed to a video apparatus and more particularly, to a video encoding apparatus and a video encoding method.

Description of Related Art

Video encoding applications based on subjective vision become more and more widely developed. In a video encoding operation, an image frame is usually divided into a plurality of blocks, while a block may include one or a plurality of sub-blocks. The video encoding operation of a conventional video encoding apparatus usually involves a process of obtaining a motion vector for each of the blocks. A process of searching the motion vector is also referred to as motion estimation. A motion vector points from a block in a current frame to a block in a reference frame. The conventional video encoding apparatus estimates a block in the current image by using a block in the reference frame and produces a predicted residual value. An encoder performs operations, such as transformation, quantization and entropy coding, on the produced residual value.

However, an original image data usually contains noise. In the video encoding operation, it is especially important to perform noise reduction on the original image data. The noise can be eliminated by using a filter. In the conventional video encoding apparatus, the filter is employed as a front stage circuit of the conventional video encoding apparatus. The conventional filter and the conventional video encoding apparatus are two different elements that are separately operated. The conventional filter performs a filtering process on the original image data and then provides a denoised image data to the video encoding apparatus. Accordingly, how to perform the filtering operation during video encoding operation is an issue that the technicians of the art concerns about.

SUMMARY

The invention provides a video encoding apparatus and a video encoding method to repeatedly apply information produced by an integer-pel motion estimation (IME) operation during a video encoding process in temporal noise reduction.

According to an embodiment of the invention, a video encoding apparatus including an integer-pel motion estimation (IME) circuit, a temporal noise reduction (TNR) circuit, a fractional-pel motion estimation (FME) circuit and an encoding circuit. The IME circuit is configured to perform an IME operation on an original image data. The IME circuit generates a first motion vector, an error value and a co-located error value of a current block during the IME operation. The error value corresponds to the first motion vector, and the co-located error value is a difference between the current block in a current frame and a co-located block in a reference frame. The TNR circuit is coupled to the IME circuit to receive the first motion vector, the error value and the co-located error value of the current block. By using the first motion vector, the error value and the co-located error value of the current block in the current frame, the TNR circuit is configured to perform a temporal filtering process on the current block in the original image data to obtain a denoised image data. The FME circuit is coupled to the TNR circuit to receive the denoised image data. The FME circuit is configured to perform an FME operation on the denoised image data to at least produce a second motion vector of the current block. The encoding circuit is coupled to the FME circuit to receive the second motion vector. The encoding circuit is configured to perform a video encoding operation.

According to an embodiment of the invention, a video encoding method including the following steps is provided. An IME operation is performed on an original image data by an IME circuit, wherein a first motion vector, an error value and a co-located error value of a current block are generated during the IME operation. The error value corresponds to the first motion vector, and the co-located error value is a difference between the current block in a current frame and a co-located block in a reference frame. By using the first motion vector, the error value and the co-located error value of the current block in the current frame, a temporal filtering process is performed on the current block in the original image data to obtain a denoised image data. An FME operation is performed on the denoised image data by an FME circuit to at least produce a second motion vector of the current block. A video encoding operation is performed by an encoding circuit.

To sum up, in the video encoding apparatus and the video encoding method of the embodiments of the invention, the information (e.g., the first motion vector, the error value and the co-located error value of the current block) generated by the IME operation and/or other information for video encoding can be reused in the temporal filtering process performed by the TNR circuit. Thus, the cost of denoising computation can be effectively reduced.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
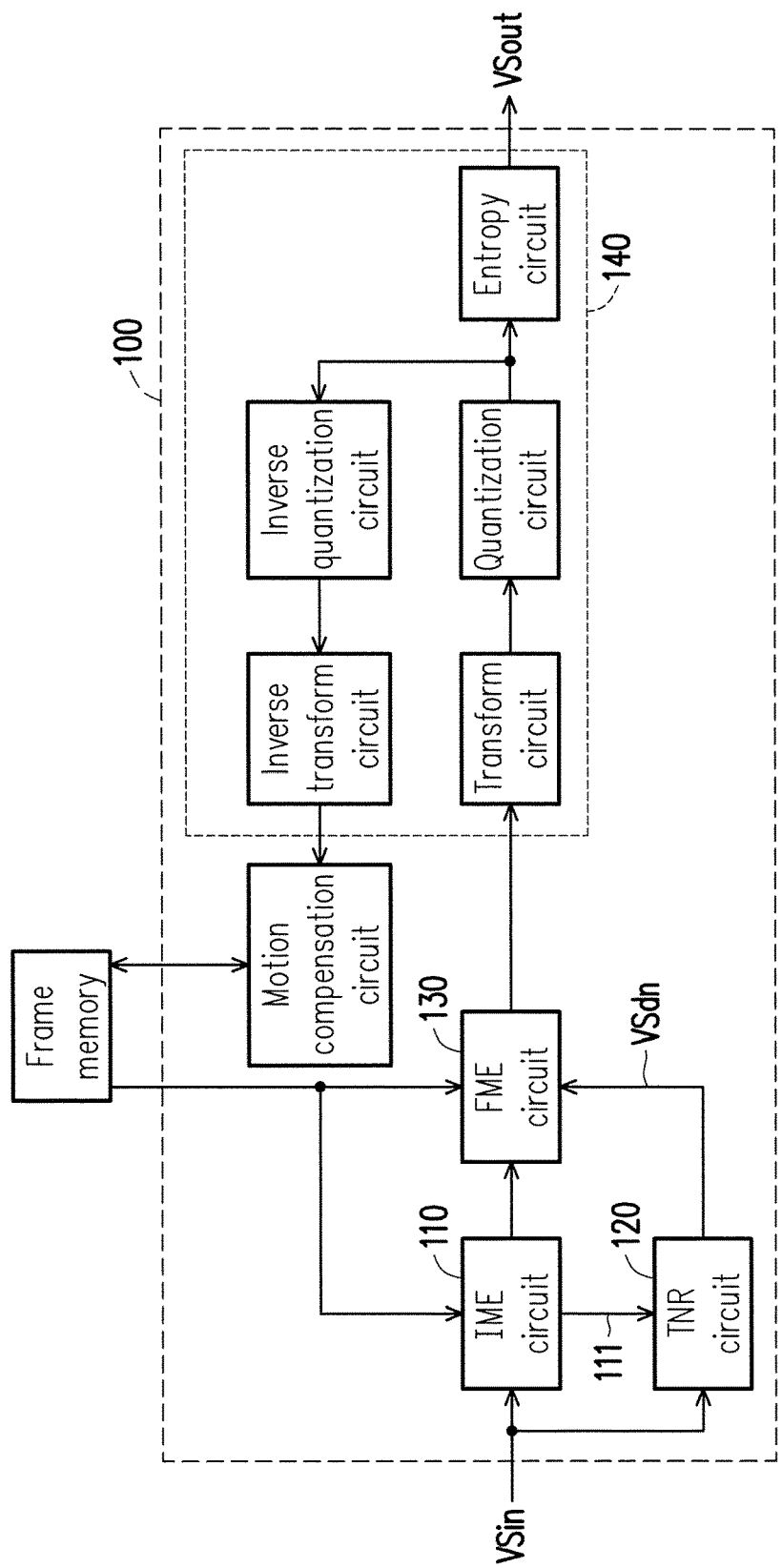
FIG. 1 is a schematic circuit block diagram illustrating a video encoding apparatus according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating a video encoding apparatus 100 according to an embodiment of the invention. Based on an application demand, the video encoding apparatus 100 may be disposed in a computer, a smartphone, a digital video camera, a digital camera, a server or any other electronic apparatus. The video encoding apparatus 100 is configured to perform a video encoding operation on an original image data VSin to produce a bit stream VSout of the video. The video encoding apparatus 100 includes an integer-pel motion estimation (IME) circuit 110, a temporal noise reduction (TNR) circuit 120, a fractional-pel motion estimation (FME) circuit 130 and an encoding circuit 140.

Figure 2:
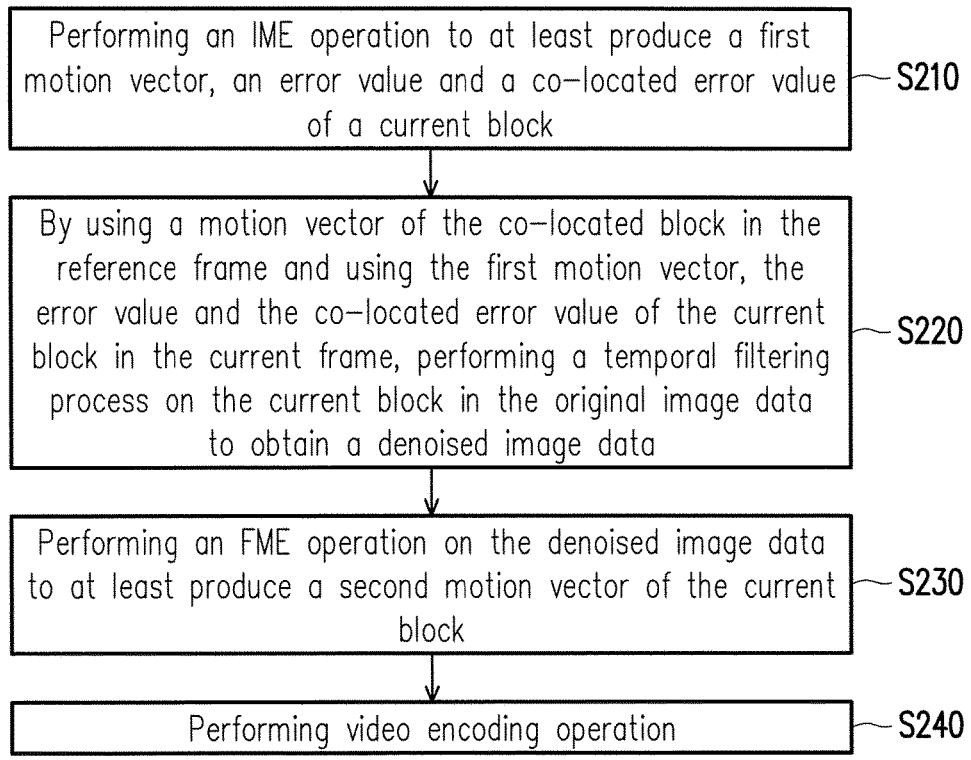
FIG. 2 is a flowchart illustrating a video encoding method according to an embodiment of the invention.

FIG. 2 is a flowchart illustrating a video encoding method according to an embodiment of the invention. Referring to FIG. 1 and FIG. 2, in step S210, the IME circuit 110 receives a current frame in the original image data VSin. A frame may be divided into a plurality of blocks. The IME circuit 110 is configured to perform a motion estimation operation according to the current frame and a reference frame (e.g., a previous frame reconstructed from the bit stream VSout), so as to obtain motion vectors of all the blocks in the current frame. Operation details of the IME circuit 110 may be determined based on design requirements. For instance, the IME circuit 110 may be a conventional IME circuit or any other motion estimation circuit. The IME circuit 110, in step S210, performs an IME operation on the original image data VSin. The IME circuit 110 generates a motion vector, an error value and a co-located error value for a current block in the current frame during the IME operation. Therein, the "motion vector" refers to a vector which points from the current block in the current frame to a matched block in the reference frame. The "error value" refers to a difference between the current block in the current frame and the matched block in the reference frame, namely, the error value corresponds to the motion vector. The "co-located error value" refers to a difference between the current block in the current frame and a co-located block in the reference frame. A position of the current block in the current frame is the same as a position of the co-located block in the reference frame.

The present embodiment does not limit algorithms for the "error value" and the "co-located error value". Based on design requirements, in some embodiments, the "error value" may be a value of a sum of absolute difference (SAD) between the current block in the current frame and the matched block in the reference frame, and the "co-located error value" may be a value of an SAD between the current block in the current frame and the co-located block in the reference frame. The algorithm for calculating the SAD values is a well-known technique and will not be repeatedly described. Hereinafter, "MV_cur" is used to represent the "motion vector" of the current block. For descriptive convenience, "SAD(mvx,mvy)" is used to represent the "error value" hereinafter, but it does not indicate that the "error value" is limited to the algorithm for calculating the SAD value. Similarly, "SAD(0,0)" is used to represent the "co-located error value" hereinafter, but it does not indicate that the "co-located error value" is limited to the algorithm for calculating the SAD value.

In step S220, the TNR circuit 120 receives the current frame in the original image data VSin. The TNR circuit 120 is coupled to the IME circuit 110 to receive motion estimation information 111 of the current block. For instance, the motion estimation information 111 may include the motion vector MV_cur, the error value SAD(mvx,mvy), the co-located error value SAD(0,0) and/or other information. By using a motion vector MV_ref of the co-located block in the reference frame (which may be a previous frame reconstructed from the bit stream VSout) and using the motion vector MV_cur, the error value SAD(mvx,mvy) and the co-located error value SAD(0,0) of the current block in the current frame, the TNR circuit 120, in step S220, performs a temporal filtering process on the current block in the original image data VSin to obtain a denoised image data VSdn. Namely, the TNR circuit 120 may perform the temporal filtering process according to the current frame and the reference frame to obtain the denoised image data VSdn. The temporal filtering process is performed to suppress noise in a temporal domain. Since the reference frame is a video frame which has been denoised in advance, the temporal filtering process may effectively remove random noise and image flicker between the frames, without causing blur to image details.

The TNR circuit 120 is integrated in the video encoding apparatus 100 in the present embodiment. During the process of performing the IME operation on the original image data VSin (which is video sequence with noise), the TNR circuit 120 may perform the temporal filtering process on the original image data VSin by using the motion estimation information 111 already possessed by the IME circuit 110, thereby effectively reducing cost of denoising computation. Based on the motion estimation information 111 of the IME circuit 110, the TNR circuit 120 may distinguish a moving object and a static background, so as to perform temporal noise reduction on the moving object and the static background respectively. For example, the TNR circuit 120 may reduce a weight of a reference block in the reference frame for a current block which is determined as a moving object, and/or increase the weight of the reference block in the reference frame for a current block which is determined as a static background. Thereby, the video encoding apparatus 100 can contribute to effectively improving problems of motion blur and ghost artifacts. The video encoding apparatus 100 does not have to perform spatial noise reduction.

Based on design requirements, in some embodiments, the TNR circuit 120 performs moving object detection for detecting whether the current block in the current frame is a moving object to obtain a detection result by using the motion vector MV_cur, the error value SAD(mvx,mvy) and the co-located error value SAD(0,0) for the current block in the current frame and using the motion vector MV_ref of the co-located block in the reference frame. The TNR circuit 120 dynamically sets a temporal filtering parameter of the temporal filtering process according to the detection result. For example, the TNR circuit 120 analyzes a current motion characteristic of the current block in the current frame and a reference motion characteristic of the co-located block in the reference frame by using the motion vector MV_cur, the error value SAD(mvx,mvy) and the co-located error value SAD(0,0) for the current block in the current frame and using the motion vector MV_ref of the co-located block in the reference frame. The TNR circuit 120 determines whether the current block in the current frame is the moving object according to the current motion characteristic and the reference motion characteristic. The TNR circuit 120 decreases the temporal filtering parameter of the temporal filtering process when the current block is determined as the moving object.

Based on design requirements, in some embodiments, the temporal filtering process includes a first temporal filtering process and a second temporal filtering process. The TNR circuit 120 performs the first temporal filtering process on the current block in the original image data VSin to obtain a first denoised image data. The TNR circuit 120 performs the second temporal filtering process on the current block in the original image data VSin to obtain a second denoised image data. The TNR circuit 120 blends the first denoised image data and the second denoised image data to obtain the denoised image data VSdn according to a blending weight bld_wt, and the TNR circuit 120 decreases the blending weight bld_wt when the current block is determined as a moving object.

The denoised image data VSdn output by the TNR circuit 120 may be provided to the FME circuit 130. The motion estimation information of the IME circuit 110 may also be provided to the FME circuit 130. According to the motion estimation information provided by the IME circuit 110, the FME circuit 130, in step S230, performs an FME operation on the denoised image data VSdn to at least produce motion estimation information (including a second motion vector and/or other information) of the current block to the encoding circuit 140. Operation details related to the FME operation of the FME circuit 130 may be determined based on design requirements. For instance, the FME circuit 130 may be a conventional FME circuit or any other motion estimation circuit.

The encoding circuit 140 is coupled to the FME circuit 130 to receive the second motion vector and/or other information. In step S240, the encoding circuit 140 performs a video encoding operation to produce the bit stream VSout. The encoding circuit 140 reconstructs a reconstruction frame (e.g., previous frame) according to the bit stream VSout. The reconstruction frame may be employed as the reference frame. Operation details of the encoding circuit 140 and the video encoding operation may be determined based on design requirements. For instance, the encoding circuit 140 may be a conventional video encoding circuit or any other video encoding circuit/element.

Figure 3:
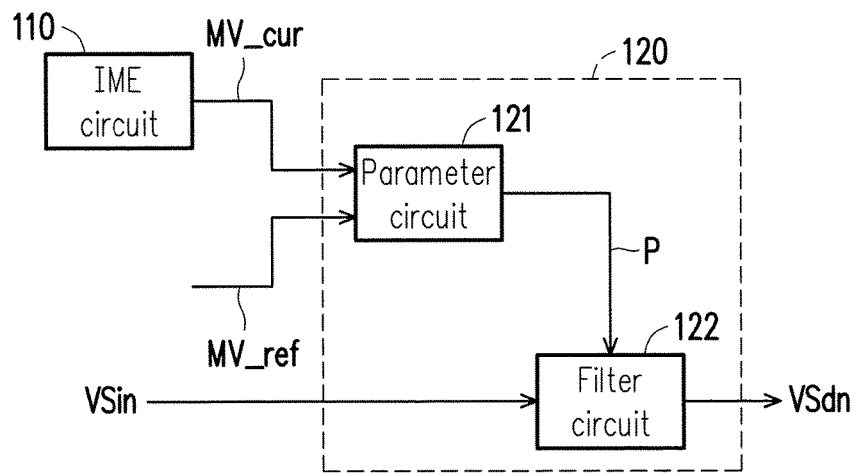
FIG. 3 is a schematic circuit block diagram illustrating the temporal noise reduction (TNR) circuit depicted in FIG. 1 according to an embodiment of the invention.

FIG. 3 is a schematic circuit block diagram illustrating the TNR circuit 120 depicted in FIG. 1 according to an embodiment of the invention. In the embodiment illustrated in FIG. 3, the TNR circuit 120 includes a parameter circuit 121 and a filter circuit 122. The parameter circuit 121 is coupled to the IME circuit 110 to receive the motion vector MV_cur of the current block in the current frame.

Figure 4:
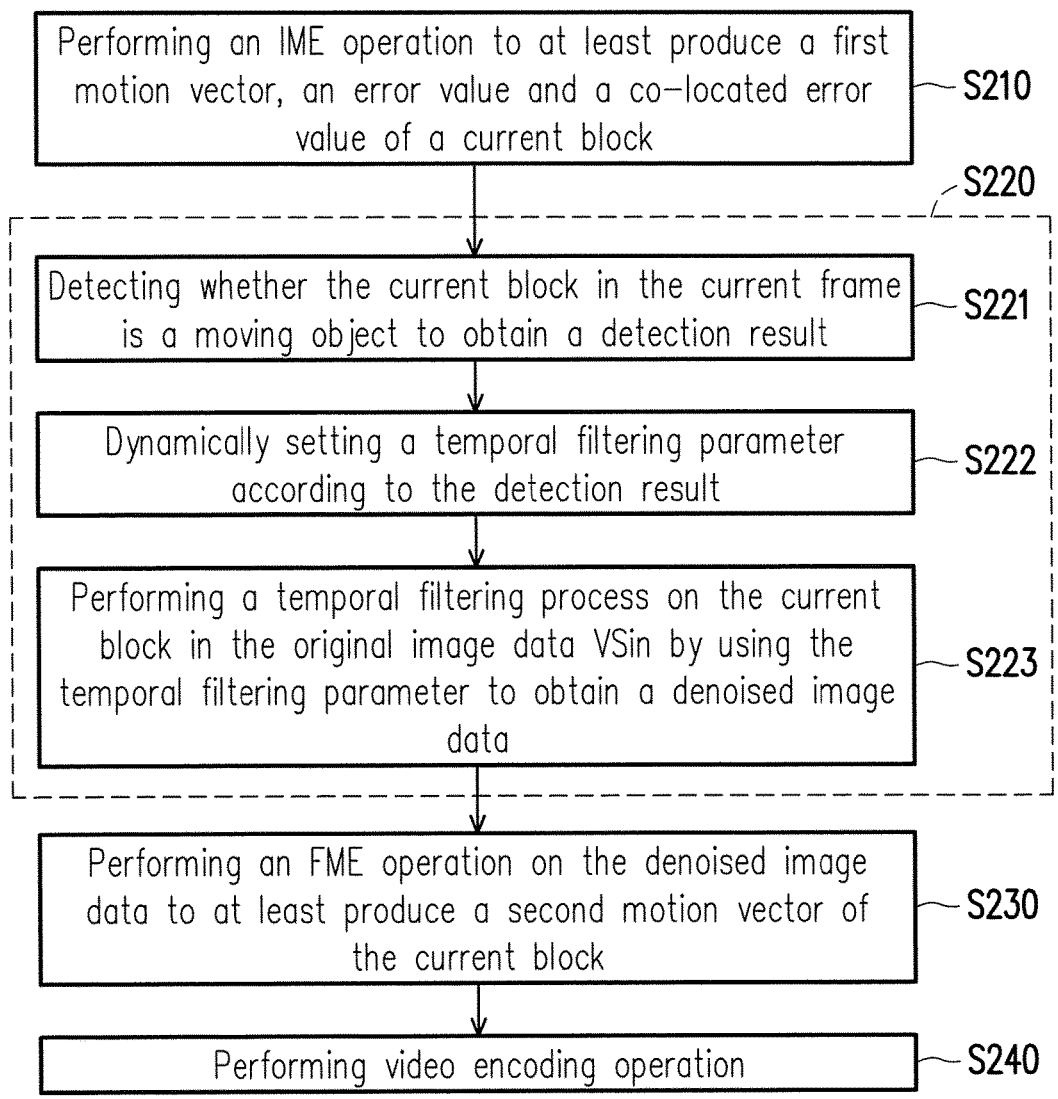
FIG. 4 is a flowchart illustrating a video encoding method according to another embodiment of the invention.

FIG. 4 is a flowchart illustrating a video encoding method according to another embodiment of the invention. Steps S210, S220, S230 and S240 illustrated in FIG. 4 may refer to the description related to FIG. 2 and thus, will not be repeated. In the embodiment illustrated in FIG. 4, step S220 includes steps S221, S222 and S223. Referring to FIG. 3 and FIG. 4. In step S221, by using the motion vector MV_ref of the co-located block in the reference frame and using the motion vector MV_cur of the current block in the current frame, the parameter circuit 121 detects whether the current block in the current frame is the moving object, so as to obtain the detection result. In step S222, the parameter circuit 121 dynamically sets a temporal filtering parameter P according to the detection result.

For example (not limited to), a background parameter value P1 is set into the temporal filtering parameter P, wherein the value P1 is defined for static background based on design requirements. The filter circuit 122 performs the temporal filtering process, P*Bld_ref+(1−P)*Bld_cur, to obtain the denoised image data VSdn, wherein Bld_ref represents the content of the reference block in the reference frame, and Bld_cur represents the content of the current block in the current frame. The parameter circuit 121 reduces the temporal filtering parameter P from the value P1 to a foreground parameter value P2 when the detection result indicates that the current block in the current frame is the moving object. Wherein, the value P2 is defined for motion foreground based on design requirements. The "foreground parameter value P2" may be an optimization filtering parameter for a moving object (or referred to as a motion foreground). The "background parameter value P1" may be an optimization filtering parameter for a static background. The parameter circuit 121 determines the temporal filtering parameter P according to the detection result received in step S221.

The filter circuit 122 is coupled to the parameter circuit 121 to receive the temporal filtering parameter P. In step S223, the filter circuit 122 performs the temporal filtering process on the current block in the original image data VSin by using the temporal filtering parameter P to obtain the denoised image data VSdn. Operations details of the temporal filtering process of the filter circuit 122 may be determined based on design requirements. For instance, the filter circuit 122 may be a conventional motion compensation temporal filter (MCTF) circuit, a conventional point to point temporal filter (P2P) circuit or any other temporal filter circuit/element.

The filter circuit 122 performs a filter operation, i.e., the temporal filtering process, according to the current block in the current frame and the reference block in the reference frame. For instance, the parameter circuit 121 may reduce the temporal filtering parameter P for the current block which is determined as the moving object. When the temporal filtering parameter P is reduced, the filter circuit 122 reduces the weight of the reference block in the reference frame and/or increases the weight of the current block in the current frame. The parameter circuit 121 may increase the temporal filtering parameter P for the current block which is determined as the static background. When the temporal filtering parameter P is increased, the filter circuit 122 may increase the weight of the reference block in the reference frame and/or reduce the weight of the current block in the current frame. Since the reference frame from the frame memory 150 has been denoised in advance, the temporal filtering process of the filter circuit 122 may effectively remove random noise and image flicker between two frames, so as to improve the problems of motion blur and ghost artifacts.

Figure 5:
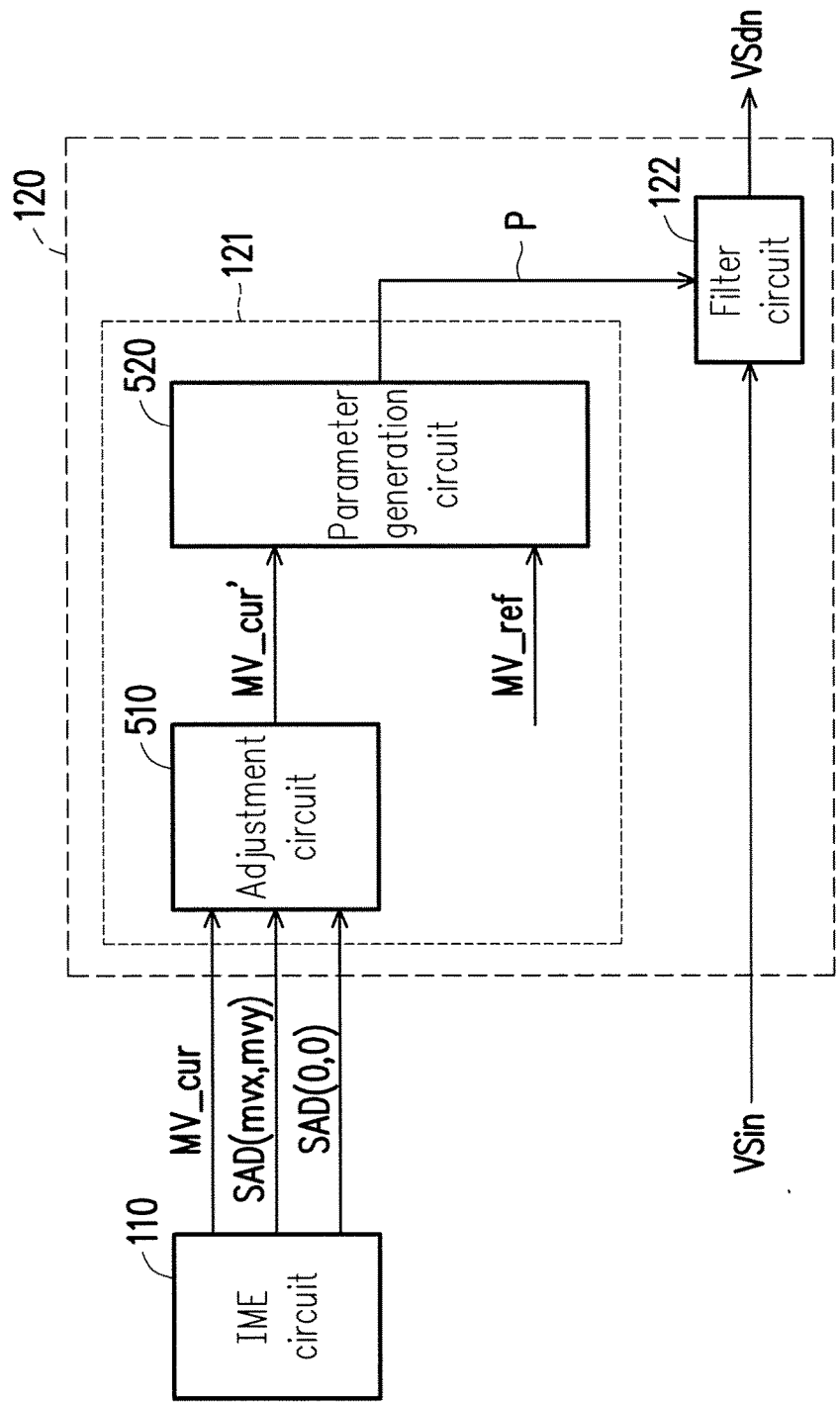
FIG. 5 is a schematic circuit block diagram illustrating the parameter circuit depicted in FIG. 3 according to an embodiment of the invention.

FIG. 5 is a schematic circuit block diagram illustrating the parameter circuit 121 depicted in FIG. 3 according to an embodiment of the invention. In the embodiment illustrated in FIG. 5, the parameter circuit 121 includes an adjustment circuit 510 and a parameter generation circuit 520. The adjustment circuit 510 is coupled to the IME circuit 110 to receive the motion vector MV_cur, the error value SAD (mvx,mvy) and the co-located error value SAD(0,0) of the current block. According to the error value SAD(mvx,mvy) and the co-located error value SAD(0,0) of the current block, the adjustment circuit 510 determines whether to set the motion vector MV_cur of the current block to a zero vector and employs the zero vector as an adjusted motion vector MV_cur' to provide to the parameter generation circuit 520. For example (not limited to), the adjustment circuit 510 may check whether conditions 1 and 2 listed below are satisfied. In condition 1, C1 represents a first coefficient, and C2 represents a second coefficient. In condition 2, th1 represents a first threshold. The first coefficient C1, the second coefficient C2 and the first threshold th1 are real numbers and may be determined based on design requirements.

$$C1*SAD(mvx,mvy) > C2*SAD(0,0) \quad \text{(Condition 1)}$$

$$SAD(0,0) < th1 \quad \text{(Condition 2)}$$

When condition 1 is not satisfied, or condition 2 is not satisfied, the adjustment circuit 510 employs the motion vector MV_cur as the adjusted motion vector MV_cur' to provide to the parameter generation circuit 520. When both conditions 1 and 2 are satisfied, it represents that a reliability of the motion vector MV_cur of the current block is low, and thus, the adjustment circuit 510 sets the motion vector MV_cur to the zero vector and employs the zero vector as the adjusted motion vector MV_cur' to provide to the parameter generation circuit 520.

The parameter generation circuit 520 is coupled to the adjustment circuit 510 to receive the adjusted motion vector MV_cur'. According to conditions 1 and 2, the adjusted motion vector MV_cur' may be the motion vector MV_cur or the zero vector. By using the motion vector MV_ref of the co-located block in the reference frame and the adjusted motion vector MV_cur' of the current block in the current frame, the parameter generation circuit 520, in step S221, detects whether the current block in the current frame is the moving object to obtain the detection result. The parameter generation circuit 520, in step S222, dynamically sets the temporal filtering parameter P according to the detection result obtained in step S221.

For example (not limited to), the parameter generation circuit 520 may check whether condition 3 or condition 4 listed below is satisfied. In conditions 3 and 4, th2 represents a second threshold, and th3 represents a third threshold. The second threshold th2 and the third threshold th3 are real numbers and may be determined based on design requirements. When condition 3 or condition 4 is satisfied, it indicates that the current block in the current frame is the moving object (or referred to as the motion foreground). When the detection result obtained in step S221 indicates that the current block in the current frame is the moving object, the parameter generation circuit 520 reduces the temporal filtering parameter P from the background parameter value P1 to the foreground parameter value P2. When the detection result obtained in step S221 indicates that the current block in the current frame is not the moving object, i.e., both conditions 3 and condition 4 are not satisfied, the parameter generation circuit 520 increases the temporal filtering parameter P from the foreground parameter value P2 to the background parameter P1. The foreground parameter value P2 and the background parameter value P1 may be previously recorded in the parameter generation circuit 520.

$$|MV\_ref| > th2 \quad \text{(Condition 3)}$$

$$|MV\_cur'| > th3 \quad \text{(Condition 4)}$$

In another embodiment, the parameter generation circuit 520 may obtain the temporal filtering parameter P by calculating equation 1 listed below. In equation 1, P1 represents a background parameter value, P2 represents another value smaller than the value P1, P3 represents another value smaller than the value P2, th4 represents a fourth threshold, th5 represents a fifth threshold, th6 represents a sixth threshold, and th7 represents a seventh threshold. The value P1, the value P2, the value P3, the fourth threshold th4, the fifth threshold th5, the sixth threshold th6 and the seventh threshold th7 are real numbers and may be determined based on design requirements. The fourth threshold th4 is greater than the sixth threshold th6, and the fifth threshold th5 is greater than the seventh threshold th7. When the motion vector MV_ref is greater than the fourth threshold th4, or the adjusted motion vector MV_cur' is greater than the fifth threshold th5, the parameter generation circuit 520 selects the value P3 as the parameter P. When the motion vector MV_ref is greater than the sixth threshold th6, or the adjusted motion vector MV_cur' is greater than the seventh threshold th7, the parameter generation circuit 520 selects the value P2 as the parameter P. Otherwise, the parameter generation circuit 520 selects the value P1 as the parameter P.

$$P = \begin{cases} P3, & \text{if } |MV\_ref| > th4 \text{ or } |MV\_cur'| > th5 \\ P2, & \text{if } |MV\_ref| > th6 \text{ or } |MV\_cur'| > th7 \\ P1, & \text{else} \end{cases} \quad \text{(Equation 1)}$$

Figure 6:
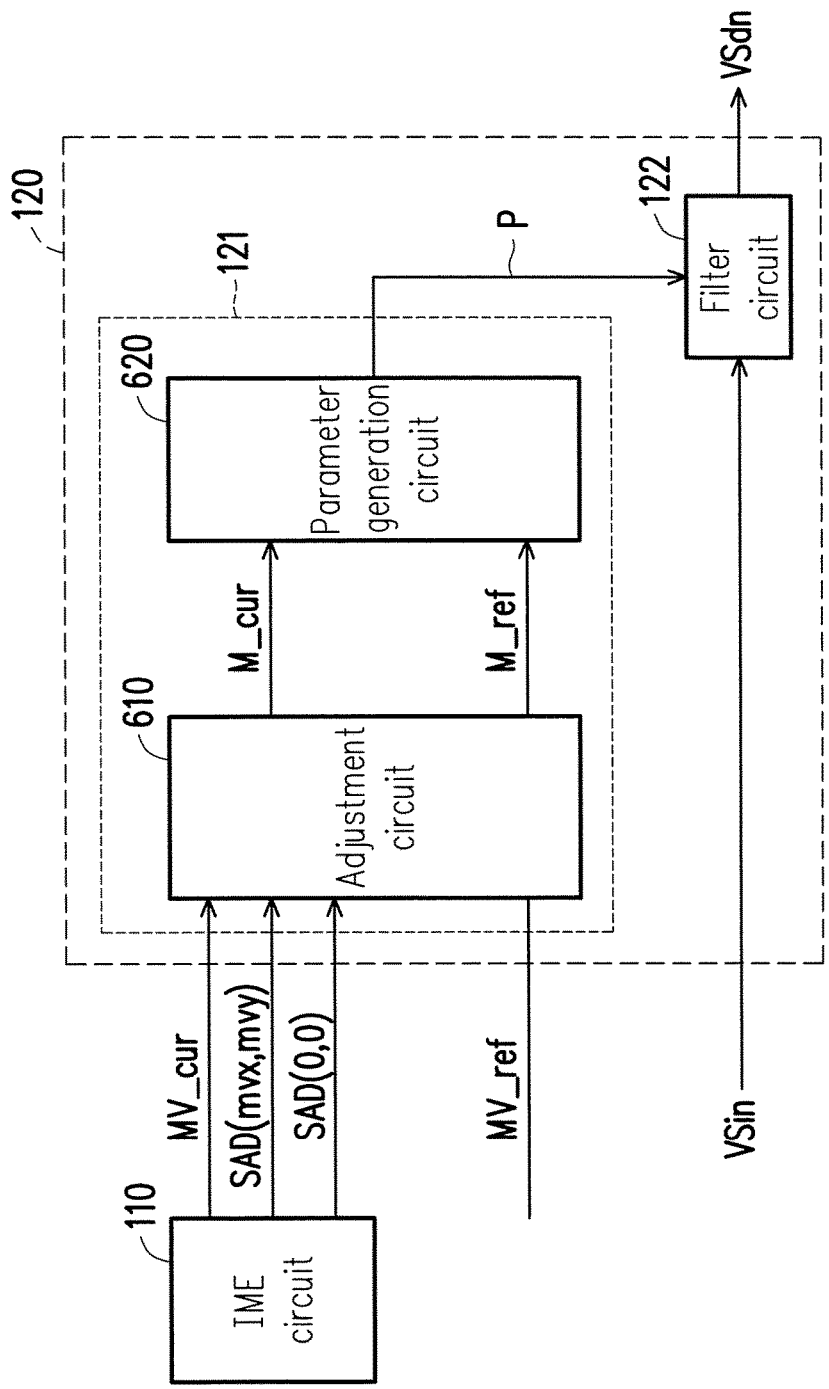
FIG. 6 is a schematic circuit block diagram illustrating the parameter circuit depicted in FIG. 3 according to another embodiment of the invention.

FIG. 6 is a schematic circuit block diagram illustrating the parameter circuit 121 depicted in FIG. 3 according to another embodiment of the invention. In the embodiment illustrated in FIG. 6, the parameter circuit 121 includes an adjustment circuit 610 and a parameter generation circuit 620. The adjustment circuit 610 is coupled to the IME circuit 110 to receive the motion vector MV_cur, the error value SAD(mvx,mvy) and the co-located error value SAD(0,0) for the current block. The co-located block in the reference frame may be divided into a plurality of sub-blocks. The adjustment circuit 610 may accumulate motion vectors of a portion of (or all of) the sub-blocks of the co-located block in the reference frame to obtain reference motion characteristic M_ref of the co-located block in the reference frame. The current block in the current frame may be divided into a plurality of sub-blocks. The adjustment circuit 610 may accumulate motion vectors of a portion of (or all of) the sub-blocks of the current block in the current frame to obtain current motion characteristic of the current block M_cur in the current frame. For example (not limited to), the adjustment circuit 610 may obtain the reference motion characteristic M_ref and current motion characteristic M_cur by calculating equations 2 and 3 listed below. In equations 2 and 3, it is assumed that the number of the sub-blocks to be selected for the accumulation is n, an x and a y components of the motion vector of each sub-block of the co-located block in the reference frame are comv.x and comv.y, respectively, and an x and a y components of the motion vector of each sub-block of the current block in the current frame are imv.x and imv.y, respectively.

$$\text{M\_ref} = \left| \sum_{i=1}^{n} comv.x_i \right| + \left| \sum_{j=1}^{n} comv.y_j \right| \quad \text{(Equation 2)}$$

$$\text{M\_cur} = \left| \sum_{i=1}^{n} imv.x_i \right| + \left| \sum_{j=1}^{n} imv.y_j \right| \quad \text{(Equation 3)}$$

Equations 2 and 3 may be further used to eliminate noise interference. Namely, when the motion vectors of multiple sub-blocks are true motion vectors, the accumulated value (M_ref or M_cur) is increased according to motion consistency of neighbor sub-blocks. By contrast, if the motion vectors of multiple sub-blocks are noise, the accumulated value (M_ref or M_cur) is reduced according to randomness of noise.

Figure 7:
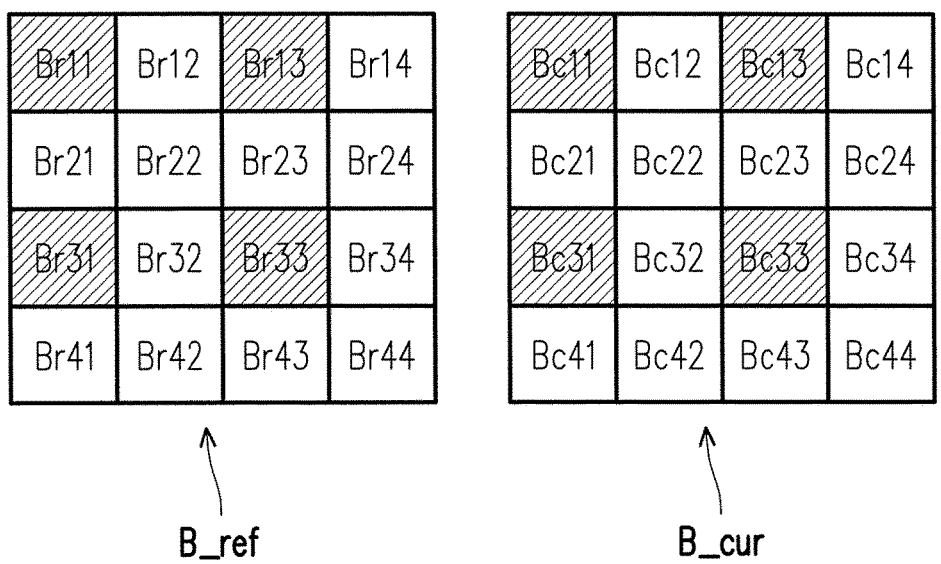
FIG. 7 is a schematic diagram illustrating sub-blocks of the current block and sub-blocks of the co-located block according to an embodiment of the invention.

FIG. 7 is a schematic diagram illustrating sub-blocks of the current block B_cur and sub-blocks of the co-located block B_ref according to an embodiment of the invention. In the embodiment illustrated in FIG. 7, the co-located block B_ref and the current block B_cur are assumed as blocks each with 16*16 pixels. The co-located block B_ref is divided into 4*4 sub-blocks, i.e., sub-blocks Br11, Br12, Br13, Br14, Br21, Br22, Br23, Br24, Br31, Br32, Br33, Br34, Br41, Br42, Br43 and Br44, where each sub-block has 4*4 pixels. The current block B_cur is divided into 4*4 sub-blocks, i.e., sub-blocks Bc11, Bc12, Bc13, Bc14, Bc21, Bc22, Bc23, Bc24, Bc31, Bc32, Bc33, Bc34, Bc41, Bc42, Bc43 and Bc44, where each sub-block has 4*4 pixels. The adjustment circuit 610 may accumulate the motion vectors of a portion of the sub-blocks (e.g., Br11, Br13, Br31 and Br33) of the co-located block in the reference frame B_ref by using equation 2 to obtain the reference motion characteristic M_ref of the co-located block B_ref. The adjustment circuit 610 may accumulate the motion vectors of a portion of the sub-blocks (e.g., Bc11, Bc13, Bc31 and Bc33) of the current block in the current frame B_cur by using equation 3 to obtain the current motion characteristic M_cur of the current block in the current frame B_cur.

According to the error value SAD(mvx,mvy) and the co-located error value SAD(0,0) of the current block B_cur, the adjustment circuit 610 may determine whether to further set the current motion characteristic M_cur of the current block B_cur to zero. For example (not limited to), the adjustment circuit 610 may check whether conditions 1 and 2 listed above are satisfied. When condition 1 is not satisfied, or condition 2 is not satisfied, the adjustment circuit 610 may provide the current motion characteristic M_cur calculated by using equation 3 to the parameter generation circuit 620. When both conditions 1 and 2 are satisfied, it indicates that the reliability of the motion vector MV_cur of the current block is low, and thus, the adjustment circuit 610 may reset the current motion characteristic M_cur to zero and employ the value of zero as the current motion characteristic M_cur to provide to the parameter generation circuit 620.

The parameter generation circuit 620 is coupled to the adjustment circuit 610 to receive the reference motion characteristic M_ref and the current motion characteristic M_cur. By using the reference motion characteristic M_ref and the current motion characteristic M_cur, the parameter generation circuit 620, in step S221, detects whether the current block in the current frame is the moving object, so as to obtain the detection result. The parameter generation circuit 620 dynamically sets the temporal filtering parameter P according to the detection result obtained in step S221.

For example (not limited to), the parameter generation circuit 620, in step S221, checks whether condition 5 or condition 6 is satisfied. In conditions 5 and 6, th8 represents an eighth threshold, and th9 represents a ninth threshold. The eighth threshold th8 and the ninth threshold th9 are real numbers and may be determined based on design requirements. When condition 5 or condition 6 is satisfied, it indicates that the current block in the current frame is the moving object (or referred to as the motion foreground). When the detection result obtained in step S221 indicates that the current block in the current frame is the moving object, the parameter generation circuit 620 may reduce the temporal filtering parameter P from the background parameter value P1 to the foreground parameter value P2. When the detection result obtained in step S221 indicates that the current block in the current frame is not the moving object, i.e., both conditions 5 and 6 are not satisfied, the parameter generation circuit 620 may increases the temporal filtering parameter P from the foreground parameter value P2 to the background parameter value P1. The foreground parameter value P2 and the background parameter value P1 may be previously recorded in the parameter generation circuit 620.

$$M\_ref > th8 \quad \text{(Condition 5)}$$

$$M\_cur > th9 \quad \text{(Condition 6)}$$

In another embodiment, the parameter generation circuit 620 may obtain the temporal filtering parameter P by calculating equation 4 listed below. In equation 4, value P1, value P2, value P3, a tenth threshold th10, an eleventh threshold th11, a twelfth threshold th12 and a thirteenth threshold th13 are real numbers and may be determined based on design requirements. The value P1 is greater than the value P2, the value P2 is greater than the value P3, the tenth threshold th10 is greater than the twelfth threshold th12, and the eleventh threshold th11 is greater than the thirteenth threshold th13. When the reference motion characteristic M_ref is greater than the tenth threshold th10, or the current motion characteristic M_cur is greater than the eleventh threshold th11, the parameter generation circuit 620 may select the value P3 as the parameter P. When the reference motion characteristic M_ref is greater than the twelfth threshold th12, or the current motion characteristic M_cur is greater than the thirteenth threshold th13, the parameter generation circuit 620 may select the value P2 as the parameter P. Otherwise, the parameter generation circuit 620 may select the value P1 as the parameter P.

$$P = \begin{cases} P3, & \text{if } M\_ref > th10 \text{ or } M\_cur > th11 \\ P2, & \text{if } M\_ref > th12 \text{ or } M\_cur > th13 \\ P1, & \text{else} \end{cases} \quad \text{(Equation 4)}$$

Figure 8:
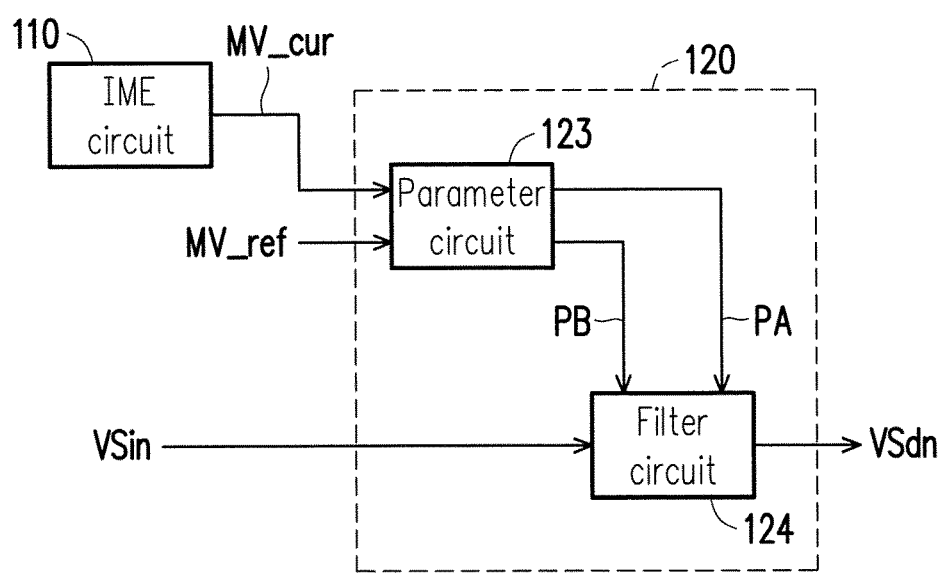
FIG. 8 is a schematic circuit block diagram illustrating the TNR circuit depicted in FIG. 1 according to another embodiment of the invention.

FIG. 8 is a schematic circuit block diagram illustrating the TNR circuit 120 depicted in FIG. 1 according to another embodiment of the invention. In the embodiment illustrated in FIG. 8, the TNR circuit 120 includes a parameter circuit 123 and a filter circuit 124. The parameter circuit 123 is coupled to the IME circuit 110 to receive the motion vector MV_cur of the current block.

Figure 9:
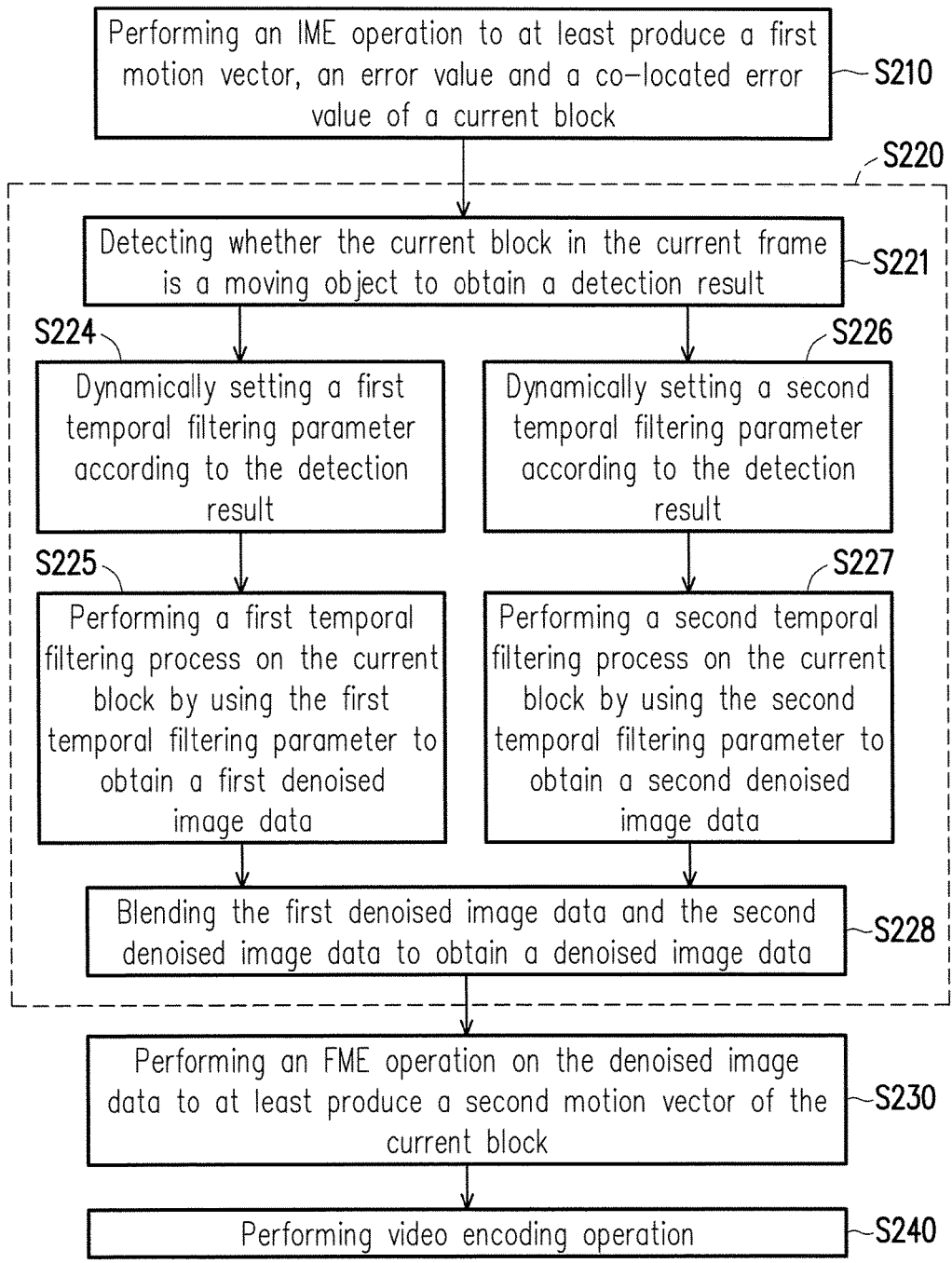
FIG. 9 is a flowchart illustrating a video encoding method according to yet another embodiment of the invention.

FIG. 9 is a flowchart illustrating a video encoding method according to yet another embodiment of the invention. Steps S210, S220, S230 and S240 may refer to the description related to FIG. 2 and thus, will not be repeated. In the embodiment illustrated in FIG. 9, step S220 includes steps S221, S224, S225, S226, S227 and S228. Referring to FIG. 8 and FIG. 9. In step S221, by using the motion vector MV_ref of the co-located block in the reference frame and the motion vector MV_cur of the current block in the current frame, the parameter circuit 123 detects whether the current block in the current frame is the moving object, so as to obtain the detection result.

In step S224, the parameter circuit 123 dynamically sets a first temporal filtering parameter PA according to the detection result obtained in step S221. For example (not limited to), a first background parameter value PA1 is set into the first temporal filtering parameter PA, wherein the value PA1 is defined for static background based on design requirements. The filter circuit 124 performs the first temporal filtering process, PA*Bld_refA+(1−PA)*Bld_cur, to obtain the first denoised image data (which is referred to as VSAdn hereinafter), wherein Bld_refA represents the content of the reference block in the reference frame, and Bld_cur represents the content of the current block in the current frame. For instance, the "first temporal filtering process" may be an operation of a conventional MCTF circuit, and Bld_refA represents the content of the matched block in the reference frame. The parameter circuit 121 reduces the first temporal filtering parameter PA from the value PA1 to a first foreground parameter value PA2 when the detection result indicates that the current block in the current frame is the moving object. Wherein, the value PA2 is defined for motion foreground based on design requirements. The parameter circuit 123 may determine the first temporal filtering parameter PA according to the detection result obtained in step S221.

The filter circuit 124 is coupled to the parameter circuit 123 to receive the first temporal filtering parameter PA and a second temporal filtering parameter PB. In step S225, the filter circuit 124 performs the "first temporal filtering process" on the current block in the original image data VSin by using the first temporal filtering parameter PA to obtain the first denoised image data VSAdn. Operation details of the "first temporal filtering process" of the filter circuit 124 may be determined based on design requirements. For instance, the "first temporal filtering process" may be an operation of a conventional MCTF circuit, an operation of a conventional P2P circuit or other temporal filter operations.

In step S226, the parameter circuit 123 dynamically sets the second temporal filtering parameter PB according to the detection result obtained in step S221. For example (not limited to), a second background parameter value PB1 is set into the second temporal filtering parameter PB, wherein the value PB1 is defined for static background based on design requirements. The filter circuit 124 performs the second temporal filtering process, PB*Bld_refB+(1−PB)*Bld_cur, to obtain the second denoised image data (which is referred to as VSBdn hereinafter), wherein Bld_refB represents the content of another reference block in the reference frame. For instance, the "second temporal filtering process" may be an operation of a conventional P2P circuit, and Bld_refB represents the content of the co-located block in the reference frame. The parameter circuit 121 reduces the second temporal filtering parameter PB from the value PB1 to a second foreground parameter value PB2 when the detection result indicates that the current block in the current frame is the moving object. Wherein, the value PB2 is defined for motion foreground based on design requirements. The parameter circuit 123 may determine the second temporal filtering parameter PB according to the detection result obtained in step S221.

In step S227, the filter circuit 124 performs a "second temporal filtering process" on the current block in the original image data VSin by using the second temporal filtering parameter PB to obtain the second denoised image data VSBdn. Operations details of the "second temporal filtering process" of the filter circuit 124 may be determined based on design requirements. For instance, the "second temporal filtering process" may be an operation of a conventional MCTF circuit, an operation of a conventional P2P circuit or other temporal filter operations. The operation of the "second temporal filtering process" is different from the operation of the "first temporal filtering process".

In step S228, the filter circuit 124 blends the first denoised image data VSAdn and the second denoised image data VSBdn to obtain the denoised image data VSdn. For example (not limited to), a fixed blending weight may be previously set in the filter circuit 124. The blending weight may be determined based on design requirements. The filter circuit 124 may blend the first denoised image data VSAdn and the second denoised image data VSBdn according to the blending weight to obtain the denoised image data VSdn.

Figure 10:
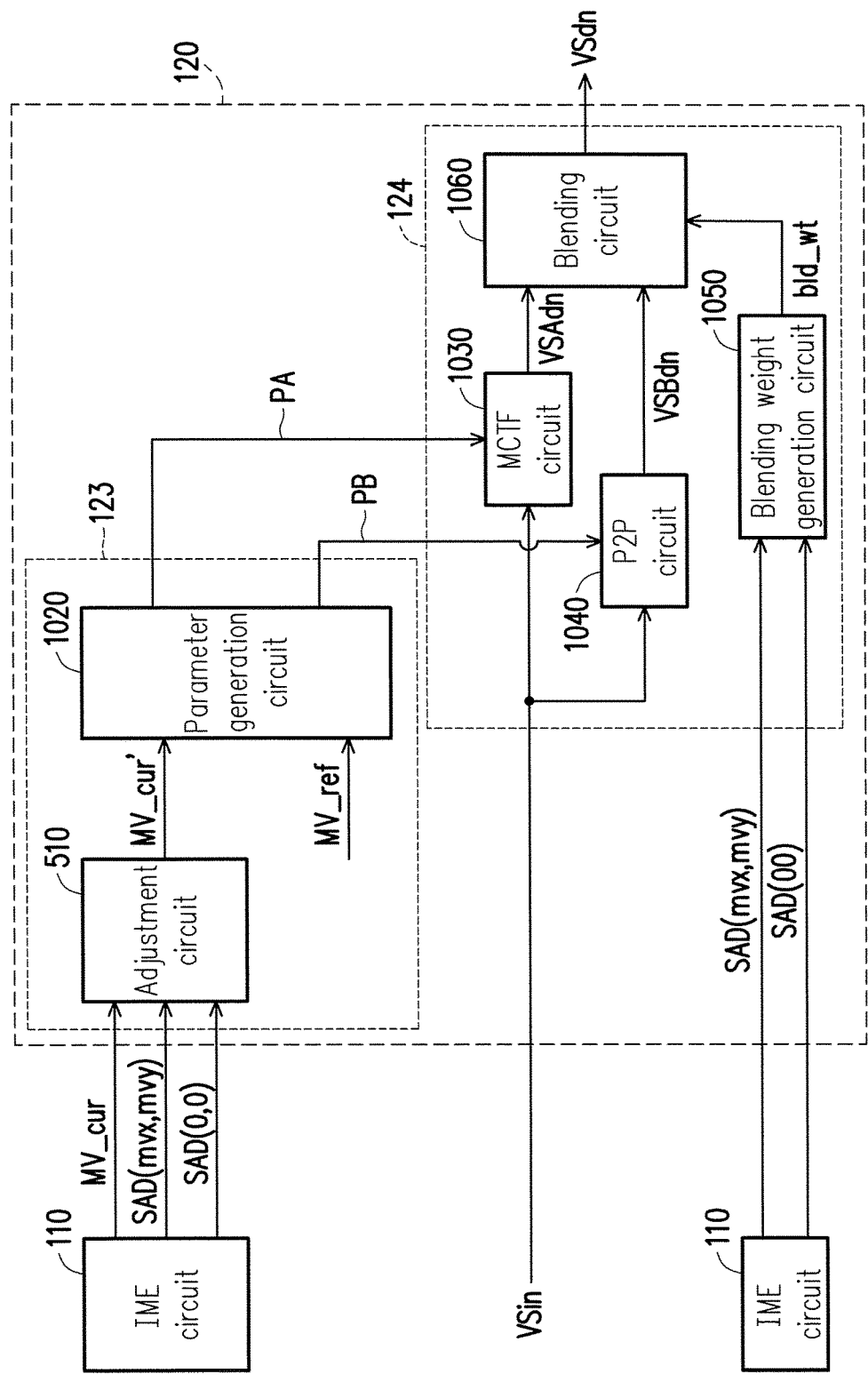
FIG. 10 is a schematic circuit block diagram illustrating the parameter circuit and the filter circuit depicted in FIG. 8 according to an embodiment of the invention.

FIG. 10 is a schematic circuit block diagram illustrating the parameter circuit 123 and the filter circuit 124 depicted in FIG. 8 according to an embodiment of the invention. In the embodiment illustrated in FIG. 10, the parameter circuit 123 includes an adjustment circuit 510 and a parameter generation circuit 1020. The adjustment circuit 510 illustrated in FIG. 10 may be inferred with reference to the description related to FIG. 5 and thus, will not be repeated.

The parameter generation circuit 1020 is coupled to the adjustment circuit 510 to receive the adjusted motion vector MV_cur'. According to conditions 1 and 2, the adjusted motion vector MV_cur' may be the motion vector MV_cur or the zero vector. By using the motion vector MV_ref of the co-located block in the reference frame and the adjusted motion vector MV_cur' of the current block in the current frame, the parameter generation circuit 1020, in step S221, detects whether the current block in the current frame is the moving object to obtain the detection result. The parameter generation circuit 1020 dynamically sets the first temporal filtering parameter PA in step S224 and dynamically sets the second temporal filtering parameter PB in step S226 according to the detection result obtained in step S221.

For example (not limited to), the parameter generation circuit 1020, in step S221, may check whether condition 3 or condition 4 listed above is satisfied. When condition 3 or condition 4 is satisfied, it indicates that the current block in the current frame is the moving object (or referred to as the motion foreground). When the detection result obtained in step S221 indicates that the current block in the current frame is the moving object, the parameter generation circuit 1020 may reduces the first temporal filtering parameter PA from the first background parameter value PA1 to the first foreground parameter value PA2 and reduces the second temporal filtering parameter PB from the second background parameter value PB1 to the second foreground parameter value PB2. When the detection result obtained in step S221 indicates that the current block in the current frame is not the moving object, i.e., both conditions 3 and 4 are not satisfied, the parameter generation circuit 1020 may increases the first temporal filtering parameter PA from the first foreground parameter value PA2 to the first background parameter PA1 and increases the second temporal filtering parameter PB from the second foreground parameter value PB2 to the second background parameter value PB1.

In another embodiment, the parameter generation circuit 1020 may obtain the first temporal filtering parameter PA by calculating equation 5 listed below, and obtain the second temporal filtering parameter PB by calculating equation 6 listed below. In equation 5, PA1 represents a first background parameter value, PA2 represents another value smaller than the value PA1, and PA3 represents another value smaller than the value PA2. The threshold th14 is greater than the threshold th16, and the threshold th15 is greater than the threshold th17. In equation 6, PB1 represents a second background parameter value, PB2 represents another value smaller than the value PB1, and PB3 represents another value smaller than the value PB2. The threshold th18 is greater than the threshold th20, and the threshold th19 is greater than the threshold th21. The value PA1, the value PA2, the value PA3, the value PB1, the value PB2, the value PB3, the threshold th14, the threshold th15, the threshold th16, the threshold th17, the threshold th18, the threshold th19, the threshold th20 and the threshold th21 are real numbers and may be determined based on design requirements.

$$PA = \begin{cases} PA3, & \text{if } |MV\_ref| > th14 \text{ or } |MV\_cur'| > th15 \\ PA2, & \text{if } |MV\_ref| > th16 \text{ or } |MV\_cur'| > th17 \\ PA1, & \text{else} \end{cases} \quad \text{(Equation 5)}$$

$$PB = \begin{cases} PB3, & \text{if } |MV\_ref| > th18 \text{ or } |MV\_cur'| > th19 \\ PB2, & \text{if } |MV\_ref| > th20 \text{ or } |MV\_cur'| > th21 \\ PB1, & \text{else} \end{cases} \quad \text{(Equation 6)}$$

In the embodiment illustrated in FIG. 10, the filter circuit 124 includes an MCTF circuit 1030, a P2P circuit 1040, a blending weight generation circuit 1050 and a blending circuit 1060. The MCTF circuit 1030 is coupled to the parameter circuit 123 to receive the first temporal filtering parameter PA. The P2P circuit 1040 is coupled to the parameter circuit 123 to receive the second temporal filtering parameter PB.

Figure 11:
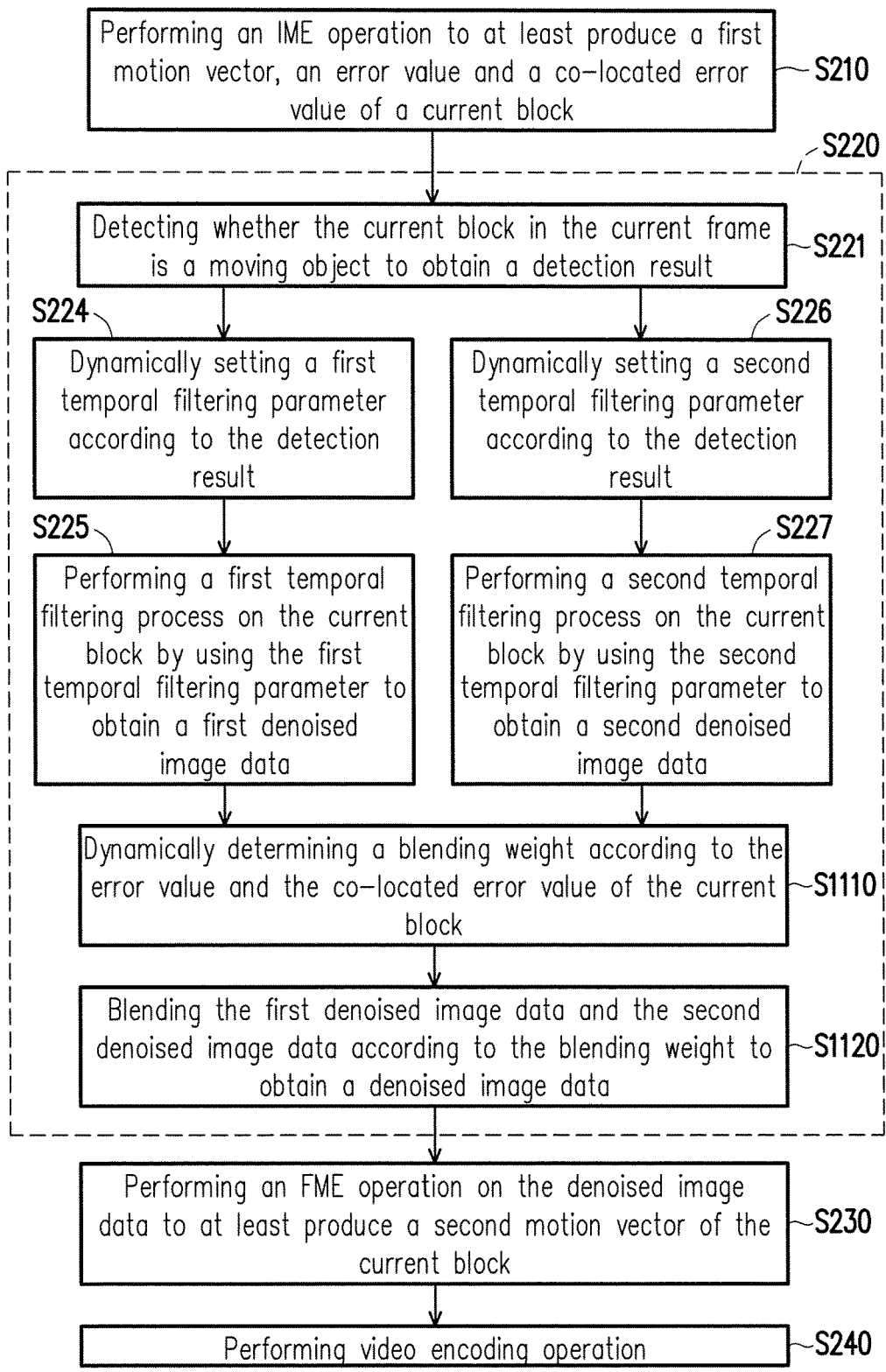
FIG. 11 is a flowchart illustrating a video encoding method according to still another embodiment of the invention.

FIG. 11 is a flowchart illustrating a video encoding method according to still another embodiment of the invention. Steps S210, S220, S230 and S240 illustrated in FIG. 11 may refer to the description related to FIG. 2 and thus, will not be repeated. In the embodiment illustrated in FIG. 11, step S220 includes steps S221, S224, S225, S226, S227, S1110 and S1120. Steps S221, S224, S225, S226 and S227 illustrated in FIG. 11 may refer to the description related to FIG. 9 and thus, will not be repeated.

Referring to FIG. 10 and FIG. 11. In step S225, the MCTF circuit 1030 performs the "first temporal filtering process" (which is an MCTF operation in this case) on the current block in the original image data VSin by using the first temporal filtering parameter PA to obtain the first denoised image data VSAdn. The MCTF circuit 1030 may be a conventional MCTF circuit or any other temporal filter circuit/element and thus, will not be repeated. In step S227, the P2P circuit 1040 performs the second temporal filtering process" (which is a P2P temporal filtering operation in this case) on the current block in the original image data VSin by using the second temporal filtering parameter PB to obtain the second denoised image data VSBdn. The P2P circuit 1040 may be a conventional P2P circuit or any other temporal filter circuit/element and thus, will not be repeated.

The blending weight generation circuit 1050 is coupled to the IME circuit 110 to receive the error value SAD(mvx, mvy) and the co-located error value SAD(0,0) for the current block. In step S1110, the blending weight generation circuit 1050 dynamically determines a blending weight bld_wt according to the error value SAD(mvx,mvy) and the co-located error value SAD(0,0) of the current block. For example, the blending weight generation circuit 1050 dynamically decreases the blending weight bld_wt according to the error value SAD(mvx,mvy) and the co-located error value SAD(0,0) for the current block when the current block is determined as a moving object. The blending weight generation circuit 1050 dynamically increases the blending weight bld_wt when the current block is not a moving object.

For example (not limited to), the blending weight generation circuit 1050 may obtain the blending weight bld_wt by calculating Algorithm 1 listed below. In Algorithm 1, the value wt0, the value wt1, the value wt2, the value wt3, the threshold th22, the threshold th23, the threshold th24 and the threshold th25 are real numbers and may be determined based on design requirements. The threshold th23 is greater than the threshold th24, and the threshold th24 is greater than the threshold th25. The value wt3 is greater than the value wt2, and the value wt2 is greater than the value wt1.

Algorithm 1:

```
if(MV_cur' > th22) then{
    bld_wt = bld_wt - wt0;
    if(SAD(mvx,mvy)/SAD(0,0) < th23) then (bld_wt = bld_wt - wt1);
    if(SAD(mvx,mvy)/SAD(0,0) < th24) then (bld_wt = bld_wt - wt2);
    if(SAD(mvx,mvy)/SAD(0,0) < th25) then (bld_wt = bld_wt - wt3);
}
```

The blending weight generation circuit 1050 may correct the mechanism of distinguishing the motion foreground and the static background according to the error value SAD (mvx,mvy) and the co-located error value SAD(0,0) provided by the IME circuit 110. Namely, the blending weight generation circuit 1050 may update the weights of the first denoised image data VSAdn and the second denoised image data VSBdn.

The blending circuit 1060 is coupled to the MCTF circuit 1030 to receive the first denoised image data VSAdn. The blending circuit 1060 is coupled to the P2P circuit 1040 to receive the second denoised image data VSBdn. The blending circuit 1060 is coupled to the blending weight generation circuit 1050 to receive the blending weight bld_wt. The blending circuit 1060, in step S1120, blends the first denoised image data VSAdn and the second denoised image data VSBdn according to the blending weight bld_wt to obtain the denoised image data VSdn. For example (not limited to), the blending circuit 1060 may obtain the denoised image data VSdn by calculating an equation, VSdn=bld_wt*VSAdn+(1−bld_wt)*VSBdn. The blending circuit 1060 may output the denoised image data VSdn to the FME circuit 130. The blending circuit 1060 may be a conventional blending circuit or any other blending circuit/element and thus, will not be repeated.

Figure 12:
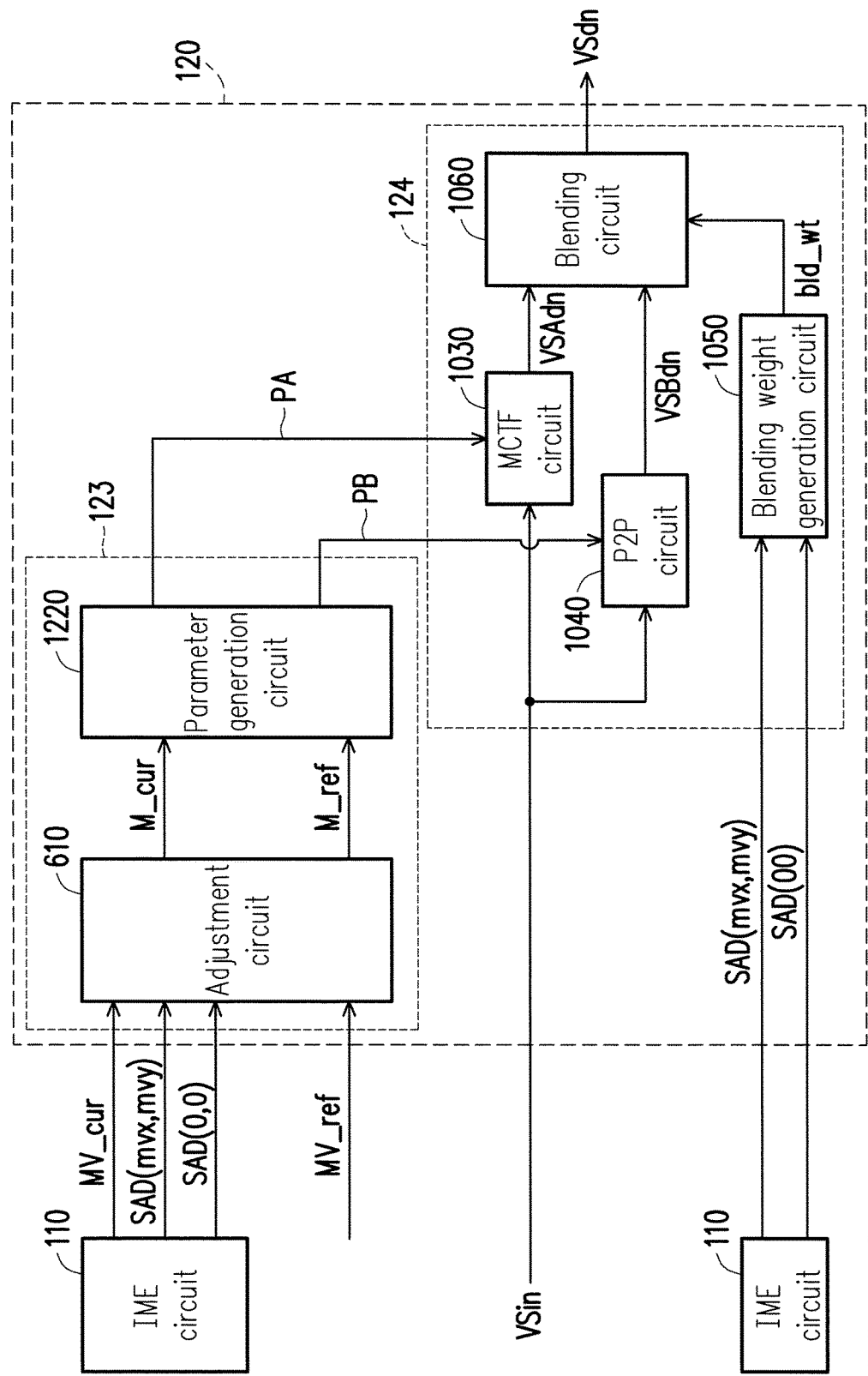
FIG. 12 is a schematic circuit block diagram illustrating the parameter circuit and the filter circuit depicted in FIG. 8 according to another embodiment of the invention.

FIG. 12 is a schematic circuit block diagram illustrating the parameter circuit 123 and the filter circuit 124 depicted in FIG. 8 according to another embodiment of the invention. The filter circuit 124 illustrated in FIG. 12 may be inferred with reference to the description related to FIG. 10 and thus, will not be repeated. In the embodiment illustrated in FIG. 12, the parameter circuit 123 includes an adjustment circuit 610 and a parameter generation circuit 1220. The adjustment circuit 610 illustrated in FIG. 12 may be inferred with reference to the description related to FIG. 6 and thus, will not be repeated.

Referring to FIG. 12, the adjustment circuit 610 may provide the current motion characteristic M_cur and the reference motion characteristic M_ref to the parameter generation circuit 1220. By using the reference motion characteristic M_ref and the current motion characteristic M_cur, the parameter generation circuit 1220, in step S221, detects whether the current block in the current frame is the moving object to obtain the detection result. The parameter generation circuit 1220 dynamically sets the first temporal filtering parameter PA and the second temporal filtering parameter PB according to the detection result obtained in step S221.

For example (not limited to), the parameter generation circuit 1220, in step S221, may check whether condition 5 or condition 6 is satisfied. When condition 5 or condition 6 is satisfied, it indicates that the current block in the current frame is the moving object (or referred to as the motion foreground). When the detection result obtained in step S221 indicates that the current block in the current frame is the moving object, the parameter generation circuit 1220 may reduce the first temporal filtering parameter PA from the first background parameter value PA1 to the first foreground parameter PA2, and reduces the second temporal filtering parameter PB from the second background parameter value PB1 to the second foreground parameter PB2. When the detection result obtained in step S221 indicates that the current block in the current frame is not the moving object, i.e., both conditions 5 and 6 are not satisfied, the parameter generation circuit 1220 may increases the first temporal filtering parameter PA from the first foreground parameter value PA2 to the first background parameter PA1, and increases the second temporal filtering parameter PB from the second foreground parameter value PB2 to the second background parameter PB1.

In another embodiment, the parameter generation circuit 1220 may obtain the first temporal filtering parameter PA by calculating equation 5 listed above and obtain the second temporal filtering parameter PB by calculating equation 6 listed above.

Figure 13:
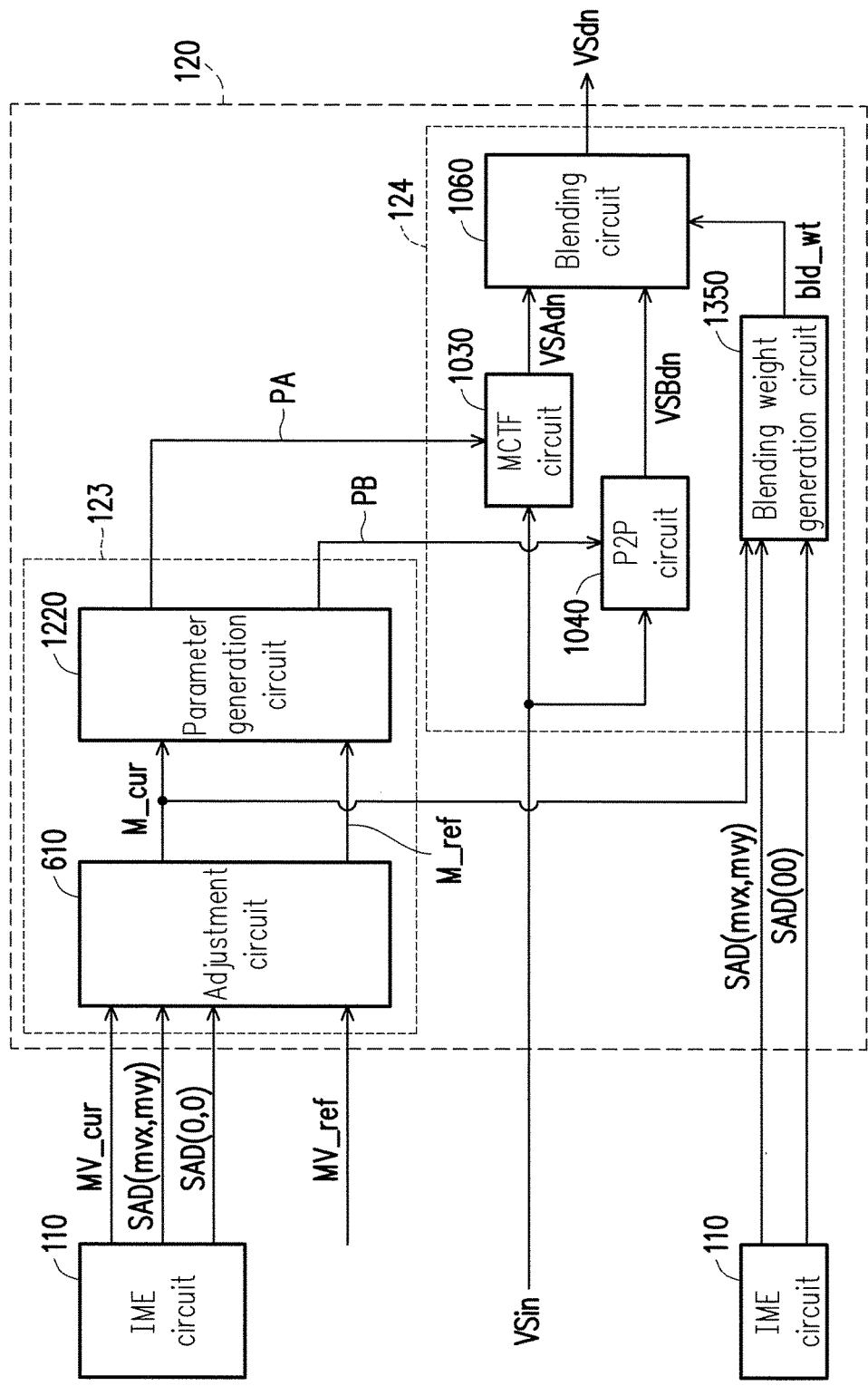
FIG. 13 is a schematic circuit block diagram illustrating the parameter circuit and the filter circuit depicted in FIG. 8 according to yet another embodiment of the invention.

FIG. 13 is a schematic circuit block diagram illustrating the parameter circuit 123 and the filter circuit 124 depicted in FIG. 8 according to yet another embodiment of the invention. The parameter circuit 123 illustrated in FIG. 13 may be inferred with reference to the description related to FIG. 12 and thus, will not be repeated. In the embodiment illustrated in FIG. 13, the filter circuit 124 includes an MCTF circuit 1030, a P2P circuit 1040, a blending weight generation circuit 1350 and a blending circuit 1060. The MCTF circuit 1030, the P2P circuits 1040 and the blending circuit 1060 illustrated in FIG. 13 may be inferred with reference to the description related to FIG. 10 and thus, will not be repeated.

The blending weight generation circuit 1350 is coupled to the IME circuit 110 to receive the error value SAD(mvx,mvy) and the co-located error value SAD(0,0) for the current block. The blending weight generation circuit 1350 determines whether to perform a weight adjustment operation according to the current motion characteristic M_cur corresponding to the motion vector MV_cur of the current block to determine the blending weight bld_wt. In the weight adjustment operation, the blending weight generation circuit 1350 dynamically determines the blending weight bld_wt according to the error value SAD(mvx,mvy) and the co-located error value SAD(0,0) of the current block. For example, the blending weight generation circuit 1350 dynamically decreases the blending weight bld_wt according to the error value SAD(mvx,mvy) and the co-located error value SAD(0,0) for the current block when the current block is determined as a moving object. The blending weight generation circuit 1350 dynamically increases the blending weight bld_wt when the current block is not a moving object. The weight adjustment operation may be inferred with reference to the description related to the blending weight generation circuit 1050 illustrated in FIG. 10 and thus, will not be repeated.

For example (not limited to), the blending weight generation circuit 1350 may obtain the blending weight bld_wt by calculating Algorithm 2 listed below. In Algorithm 2, the value wt0, the value wt1, the value wt2, the value wt3, the threshold th26, the threshold th27, the threshold th28 and the threshold th29 are real numbers and may be determined based on design requirements. The threshold th27 is greater than the threshold th28, and the threshold th28 is greater than the threshold th29. The value wt3 is greater than the value wt2, and the value wt2 is greater than the value wt1.

Algorithm 2:

```
if(M_cur > th26) then{
    bld_wt = bld_wt - wt0;
    if(SAD(mvx,mvy)/SAD(0,0) < th27) then (bld_wt = bld_wt - wt1);
    if(SAD(mvx,mvy)/SAD(0,0) < th28) then (bld_wt = bld_wt - wt2);
    if(SAD(mvx,mvy)/SAD(0,0) < th29) then (bld_wt = bld_wt - wt3);
}
```

In light of the foregoing, the motion estimation operation is one step of the video encoding operation performed by the video encoding apparatus 100. For example, as shown in FIG. 1, the IME circuit 110 performs the IME operation on the original image data VSin. The TNR circuit 120 is integrated in the video encoding apparatus 100 in the embodiments described above. During the process of performing the IME operation on the original image data VSin (which is a stream with noise), the IME circuit 110 at least produces the motion vector MV_cur, the error value SAD (mvx,mvy) and the co-located error value SAD(0,0) of the current block. The TNR circuit 120 may perform the temporal filtering process on the original image data VSin by using the information already possessed by the IME circuit 110, thereby effectively reducing the cost of denoising computation.

The parameter circuit of the TNR circuit 120 may perform the moving object detection by using the motion vector MV_cur, the error value SAD(mvx,mvy) and the co-located error value SAD(0,0) of the IME circuit 110, thereby determining whether the current block is the moving object (i.e., the motion foreground) or the static background, so as to respectively perform the denoising operation on the moving object and the static background. The TNR circuit 120 may correspondingly perform a temporal filter refresh operation according to the determining result of the foreground/background, for example, perform the temporal filter refresh operation on the current block which is determined as the moving object (i.e., the motion foreground) (e.g., by reducing the weight of the reference block in the reference frame). The TNR circuit 120 may increase the weight of the reference block in the reference frame for the current block which is determined as the static background. Thus, the TNR circuit 120 may contribute to improving the problems of motion blur and ghost artifacts.

The TNR circuit 120 may also perform a block blending weight refresh operation. Namely, the TNR circuit 120 may perform the block blending weight refresh operation by using the error value SAD(mvx,mvy) corresponding to a matched block, the co-located error value SAD(0,0) corresponding to the co-located block and the motion vector MV_cur pointing from the current block in the current frame to the reference frame. Thus, by performing the temporal filter refresh operation on the block which is detected as the moving object, the TNR circuit 120 may reduce the weight of the reference block, so as to effectively improve the problems of motion blur and motion ghost artifacts. The denoised image data VSdn output by the TNR circuit 120 may be provided to the FME circuit 130. The video encoding apparatus 100 does not have to perform the spatial noise reduction and can achieve enhancement of coding compression efficiency as well as improvement of image quality.

It should be noted that in different application scenarios, related functions of the TNR circuit 120, the parameter circuit 121, the filter circuit 122, the parameter circuit 123 and/or the filter circuit 124 may be implemented in a form of software, firmware or hardware by employing general programming languages (e.g., C or C++), hardware description languages (e.g., Verilog HDL or VHDL) or other suitable programming languages. The programming languages capable of executing the functions may be deployed in any known computer-accessible media, such as magnetic tapes, semiconductor memories, magnetic disks or compact disks (e.g., CD-ROM or DVD-ROM) or may be delivered through the Internet, wired communication, wireless communication or other communication media. The programming languages may be stored in the computer-accessible media for a processor of the computer to access/execute the programming codes of the programming languages. Moreover, the apparatus and the method of the invention may be implemented by means of a combination of hardware and software.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A video encoding apparatus, comprising:
   an integer-pel motion estimation circuit, configured to perform an integer-pel motion estimation operation on an original image data, wherein the integer-pel motion estimation circuit generates a first motion vector, an error value and a co-located error value for a current block during the integer-pel motion estimation operation, the error value corresponds to the first motion vector, and the co-located error value is a difference between the current block in a current frame and a co-located block in a reference frame;
   a temporal noise reduction circuit, coupled to the integer-pel motion estimation circuit to receive the first motion vector, the error value and the co-located error value of the current block, and configured to perform a temporal filtering process on the current block in the original image data by using the first motion vector, the error value and the co-located error value of the current block in the current frame to obtain a denoised image data;
   a fractional-pel motion estimation circuit, coupled to the temporal noise reduction circuit to receive the denoised image data, the first motion vector, the error value and the co-located error value, configured to perform a fractional-pel motion estimation operation on the denoised image data to at least produce a second motion vector of the current block according to the first motion vector, the error value and the co-located error value; and
   an encoding circuit, coupled to the fractional-pel motion estimation circuit to receive the second motion vector, and configured to perform a video encoding operation.

2. The video encoding apparatus according to claim 1, wherein the temporal noise reduction circuit performs moving object detection for detecting whether the current block in the current frame is a moving object to obtain a detection result by using the first motion vector, the error value and the co-located error value of the current block in the current frame and using a motion vector of the co-located block in the reference frame, and the temporal noise reduction circuit dynamically sets a temporal filtering parameter of the temporal filtering process according to the detection result.

3. The video encoding apparatus according to claim 2, wherein the temporal noise reduction circuit analyzes a current motion characteristic of the current block in the current frame and a reference motion characteristic of the co-located block in the reference frame by using the first motion vector, the error value and the co-located error value of the current block in the current frame and using the motion vector of the co-located block in the reference frame, and the temporal noise reduction circuit determines whether the current block in the current frame is the moving object according to the current motion characteristic and the reference motion characteristic.

4. The video encoding apparatus according to claim 2, wherein the temporal filtering parameter of the temporal filtering process is decreased when the current block is determined as the moving object.

5. The video encoding apparatus according to claim 1, wherein the temporal filtering process includes a first temporal filtering process and a second temporal filtering process, the temporal noise reduction circuit performs the first temporal filtering process on the current block in the original image data to obtain a first denoised image data, the temporal noise reduction circuit performs the second temporal filtering process on the current block in the original image data to obtain a second denoised image data, the temporal noise reduction circuit blends the first denoised image data and the second denoised image data to obtain the denoised image data according to a blending weight, and the temporal noise reduction circuit decreases the blending weight when the current block is determined as a moving object.

6. The video encoding apparatus according to claim 1, wherein the temporal noise reduction circuit comprises:
   a parameter circuit, coupled to the integer-pel motion estimation circuit to receive the first motion vector of the current block, detecting whether the current block in the current frame is a moving object by using a motion vector of the co-located block in the reference frame and using the first motion vector of the current block in the current frame to obtain a detection result, and dynamically setting a temporal filtering parameter according to the detection result; and a filter circuit, coupled to the parameter circuit to receive the temporal filtering parameter, and performing the temporal filtering process on the current block in the original image data by using the temporal filtering parameter to obtain the denoised image data.

7. The video encoding apparatus according to claim 6, wherein the parameter circuit comprises:

an adjustment circuit, coupled to the integer-pel motion estimation circuit to receive the first motion vector, the error value and the co-located error value of the current block, and determining whether to set the first motion vector of the current block to a zero vector according to the error value and the co-located error value of the current block; and a parameter generation circuit, coupled to the adjustment circuit to receive the first motion vector, detecting whether the current block in the current frame is the moving object by using the motion vector of the co-located block in the reference frame and the first motion vector of the current block in the current frame to obtain the detection result, and dynamically setting the temporal filtering parameter according to the detection result.

8. The video encoding apparatus according to claim 6, wherein the current block comprises a plurality of sub-blocks, and the parameter circuit comprises:

an adjustment circuit, coupled to the integer-pel motion estimation circuit to receive the first motion vector, the error value and the co-located error value of the current block, wherein the adjustment circuit accumulates motion vectors of a plurality of sub-blocks of the co-located block in the reference frame to obtain reference motion characteristic of the co-located block in the reference frame, the adjustment circuit accumulates motion vectors of the sub-blocks of the current block in the current frame to obtain current motion characteristic of the current block in the current frame, and determining whether to set the current motion characteristic of the current block to zero according to the error value and the co-located error value of the current block; and a parameter generation circuit, coupled to the adjustment circuit to receive the reference motion characteristic and the current motion characteristic, wherein the parameter generation circuit detects whether the current block in the current frame is the moving object by using the reference motion characteristic and the current motion characteristic to obtain the detection result, and dynamically setting the temporal filtering parameter according to the detection result.

9. The video encoding apparatus according to claim 1, wherein the temporal noise reduction circuit comprises:

a parameter circuit, coupled to the integer-pel motion estimation circuit to receive the first motion vector of the current block, detecting whether the current block in the current frame is a moving object by using a motion vector of the co-located block in the reference frame and the first motion vector of the current block in the current frame to obtain a detection result, and dynamically setting a first temporal filtering parameter and a second temporal filtering parameter according to the detection result; and a filter circuit, coupled to the parameter circuit to receive the first temporal filtering parameter and the second temporal filtering parameter, performing a first temporal filtering process on the current block in the original image data by using the first temporal filtering parameter to obtain a first denoised image data, performing a second temporal filtering process on the current block in the original image data by using the second temporal filtering parameter to obtain a second denoised image data, and blending the first denoised image data and the second denoised image data to obtain the denoised image data.

10. The video encoding apparatus according to claim 9, wherein the filter circuit comprises:

a motion compensation temporal filter circuit, coupled to the parameter circuit to receive the first temporal filtering parameter, and performing the first temporal filtering process on the current block in the original image data by using the first temporal filtering parameter to obtain the first denoised image data;

a point-to-point temporal filter circuit, coupled to the parameter circuit to receive the second temporal filtering parameter, and performing the second temporal filtering process on the current block in the original image data by using the second temporal filtering parameter to obtain the second denoised image data;

a blending weight generation circuit, coupled to the integer-pel motion estimation circuit to receive the error value and the co-located error value of the current block, and dynamically decreasing a blending weight according to the error value and the co-located error value of the current block when the current block is determined as a moving object; and a blending circuit, coupled to the motion compensation temporal filter circuit to receive the first denoised image data, coupled to the point-to-point temporal filter circuit to receive the second denoised image data, coupled to the blending weight generation circuit to receive the blending weight, and blending the first denoised image data and the second denoised image data according to the blending weight to obtain the denoised image data.

11. A video encoding method, comprising:

performing, by an integer-pel motion estimation circuit, an integer-pel motion estimation operation on an original image data, wherein a first motion vector, an error value and a co-located error value of a current block are generated by the integer-pel motion estimation circuit during the integer-pel motion estimation operation, the error value corresponds to the first motion vector, and the co-located error value is a difference between the current block in a current frame and a co-located block in a reference frame;

receiving, by a temporal noise reduction circuit that is coupled to the integer-pel motion estimation circuit, the first motion vector, the error value and the co-located error value of the current block from the integer-pel motion estimation circuit;

performing, by the temporal noise reduction circuit, a temporal filtering process on the current block in the original image data by using the first motion vector, the error value and the co-located error value of the current block in the current frame to obtain a denoised image data;

receiving, by a fractional-pel motion estimation circuit that is coupled to the temporal noise reduction circuit, the denoised image data, the first motion vector, the error value and the co-located error value;

performing, by the fractional-pel motion estimation circuit, a fractional-pel motion estimation operation on the denoised image data to at least produce a second motion vector of the current block according to the first motion vector, the error value and the co-located error value; and receiving the second motion vector and performing a video encoding operation by an encoding circuit that is coupled to the fractional-pel motion estimation circuit.

12. The video encoding method according to claim 11, wherein the temporal filtering process comprises:

performing, by the temporal noise reduction circuit, moving object detection for detecting whether the current block in the current frame is a moving object to obtain a detection result by using the first motion vector, the error value and the co-located error value of the current block in the current frame and using a motion vector of the co-located block in the reference frame; and dynamically setting, by the temporal noise reduction circuit, a temporal filtering parameter of the temporal filtering process according to the detection result.

13. The video encoding method according to claim 12, wherein the temporal filtering process further comprises:

analyzing, by the temporal noise reduction circuit, a current motion characteristic of the current block in the current frame and a reference motion characteristic of the co-located block in the reference frame by using the first motion vector, the error value and the co-located error value of the current block in the current frame and using the motion vector of the co-located block in the reference frame; and determining, by the temporal noise reduction circuit, whether the current block in the current frame is the moving object according to the current motion characteristic and the reference motion characteristic.

14. The video encoding method according to claim 12, wherein the temporal filtering parameter of the temporal filtering process is decreased when the current block is determined as the moving object.

15. The video encoding method according to claim 11, wherein the temporal filtering process includes a first temporal filtering process and a second temporal filtering process, and the temporal filtering process comprises:

performing, by the temporal noise reduction circuit, the first temporal filtering process on the current block in the original image data to obtain a first denoised image data;

performing, by the temporal noise reduction circuit, the second temporal filtering process on the current block in the original image data to obtain a second denoised image data;

decreasing, by the temporal noise reduction circuit, a blending weight when the current block is determined as a moving object; and blending, by the temporal noise reduction circuit, the first denoised image data and the second denoised image data to obtain the denoised image data according to the blending weight.

16. The video encoding method according to claim 11, wherein the step of performing the temporal filtering process comprises:

detecting, by a parameter circuit, whether the current block in the current frame is a moving object by using a motion vector of the co-located block in the reference frame and using the first motion vector of the current block in the current frame to obtain a detection result;

dynamically setting, by the parameter circuit, a temporal filtering parameter according to the detection result; and performing, by a filter circuit, the temporal filtering process on the current block in the original image data by using the temporal filtering parameter to obtain the denoised image data.

17. The video encoding method according to claim 16, wherein the step of detecting whether the current block in the current frame is the moving object comprises:

determining, by an adjustment circuit, whether to set the first motion vector of the current block to a zero vector according to the error value and the co-located error value of the current block; and detecting, by a parameter generation circuit, whether the current block in the current frame is the moving object by using the motion vector of the co-located block in the reference frame and the first motion vector of the current block in the current frame to obtain the detection result.

18. The video encoding method according to claim 16, wherein the current block comprises a plurality of sub-blocks, and the step of detecting whether the current block in the current frame is the moving object comprises:

accumulating, by an adjustment circuit, motion vectors of a plurality of sub-blocks of the co-located block in the reference frame to obtain reference motion characteristic of the co-located block in the reference frame;

accumulating, by the adjustment circuit, motion vectors of the sub-blocks of the current block in the current frame to obtain current motion characteristic of the current block in the current frame;

determining, by the adjustment circuit, whether to set the current motion characteristic of the current block to zero according to the error value and the co-located error value of the current block; and detecting, by a parameter generation circuit, whether the current block in the current frame is the moving object by using the reference motion characteristic and the current motion characteristic to obtain the detection result.

19. The video encoding method according to claim 11, wherein the step of performing the temporal filtering process comprises:

detecting, by a parameter circuit, whether the current block in the current frame is a moving object by using a motion vector of the co-located block in the reference frame and the first motion vector of the current block in the current frame to obtain a detection result;

dynamically setting, by the parameter circuit, a first temporal filtering parameter and a second temporal filtering parameter according to the detection result;

performing, by a filter circuit, a first temporal filtering process on the current block in the original image data by using the first temporal filtering parameter to obtain a first denoised image data;

performing, by the filter circuit, a second temporal filtering process on the current block in the original image data by using the second temporal filtering parameter to obtain a second denoised image data; and blending, by the filter circuit, the first denoised image data and the second denoised image data to obtain the denoised image data.

20. The video encoding method according to claim 19, wherein the step of performing the first temporal filtering process comprises:

performing, by a motion compensation temporal filter circuit, the first temporal filtering process on the current block in the original image data by using the first temporal filtering parameter to obtain the first denoised image data.

21. The video encoding method according to claim 19, wherein the step of performing the second temporal filtering process comprises:
   performing, by a point-to-point temporal filter circuit, the second temporal filtering process on the current block in the original image data by using the second temporal filtering parameter to obtain the second denoised image data.

22. The video encoding method according to claim 19, wherein the step of blending the first denoised image data and the second denoised image data comprising:
   dynamically decreasing, by a blending weight generation circuit, a blending weight according to the error value and the co-located error value of the current block when the current block is determined as a moving object; and
   blending, by a blending circuit, the first denoised image data and the second denoised image data according to the blending weight to obtain the denoised image data.

* * * * *